United States Patent [19]
Arif et al.

[11] Patent Number: 5,324,443
[45] Date of Patent: Jun. 28, 1994

[54] BIODEGRADABLE AQUEOUS FILTER CLEANER FORMULATION

[75] Inventors: Shoaib Arif, Cheshire; Bonnie B. Sandel, Milford, both of Conn.

[73] Assignee: Olin Corporation, Cheshire, Conn.

[21] Appl. No.: 11,553

[22] Filed: Feb. 1, 1993

Related U.S. Application Data

[63] Continuation-in-part of Ser. No. 817,231, Jan. 6, 1992, abandoned.

[51] Int. Cl.$^5$ .................... C11D 1/722; C11D 3/16
[52] U.S. Cl. ................. 252/142; 252/174.21; 252/174.18; 252/174.24; 252/173; 252/DIG. 6; 252/162
[58] Field of Search ............ 252/174.18, 174.21, 252/174.24, 173, DIG. 6, 162, 142

[56] References Cited

U.S. PATENT DOCUMENTS

| | | | |
|---|---|---|---|
| 3,382,285 | 5/1968 | Egan et al. | 260/615 |
| 3,953,352 | 4/1978 | Mizutani et al. | 252/142 |
| 4,136,025 | 1/1979 | Zwack et al. | 210/231 X |
| 4,207,421 | 6/1980 | Scardera et al. | 568/625 |
| 4,405,511 | 9/1983 | Hasenclever | 252/547 |
| 4,443,363 | 4/1984 | Klinger | 252/547 |
| 4,627,931 | 12/1986 | Malik | 252/153 |
| 4,668,423 | 5/1987 | Drozd et al. | 252/174.21 |
| 4,784,789 | 11/1988 | Jeschke | 252/174.23 |
| 4,863,629 | 9/1989 | Osberghaus | 252/162 |
| 4,874,537 | 10/1989 | Peterson et al. | 252/99 |
| 4,880,558 | 11/1989 | Jost | 252/174.23 |
| 4,921,619 | 5/1990 | Malihi et al. | 252/170 |
| 4,965,009 | 10/1990 | Bauer et al. | 252/142 |
| 5,039,441 | 8/1991 | Thomas et al. | 252/142 |

FOREIGN PATENT DOCUMENTS 2022126 12/1979 United Kingdom .

*Primary Examiner*—Paul Lieberman
*Assistant Examiner*—Kery A. Fries
*Attorney, Agent, or Firm*—F. A. Iskander

[57] ABSTRACT

A biodegradable aqueous filter cleaning formulation containing effective amounts of a biodegradable carboxylic acid and/or salt thereof, a nonionic biodegradable surfactant based on oxyalkylated linear alcohols, and a water soluble organic solvent.

14 Claims, No Drawings

BIODEGRADABLE AQUEOUS FILTER CLEANER FORMULATION

CROSS REFERENCE TO RELATED APPLICATION

This application is a continuation-in-part of pending U.S. application Ser. No. 07/817,231, filed Jan. 6, 1992 and now abandoned.

FIELD OF THE INVENTION

This invention relates to aqueous filter cleaner formulations. More particularly, the invention relates to an improved, biodegradable cleaner formulation used for cleaning filters, especially those installed in swimming pools and spas which have become fouled or clogged with organic residues, inorganic salts, oils, greases, and so forth. The fouled or clogged filter is treated with the cleaner formulation for a time sufficient to restore the filtering capacity of the filter, and then it is rinsed to remove any residual cleaning solution remaining on the filter.

BACKGROUND OF THE INVENTION

Recent environmental problems have placed particular emphasis on filter cleaner formulations and their constituents that are biodegradable, safer to handle, and are storage stable. Biodegradability is defined as that property possessed by a material which is capable of being decomposed by bacteria or living organisms, as described, for example, in U.S. Pat. No. 3,382,285 to Egan et al.

The build-up of residue material on filters used in swimming pools and spas occurs when the pores or spaces in the filter become fouled or clogged, and this can cause undesirable high pressures in the filtration system and ultimately compromises the disinfection of the water. Residue materials which can so clog or foul a filtration system include organic residues, such as plant matter, oils and greases from swimmers, sun tan lotion and other cosmetics, and inorganic material such as calcium and magnesium salts which are found in hard water.

Many filter cleaners available today are based on strong acids such as hydrochloric and sulfuric acid or on phosphates such as trisodium phosphate, sodium tripolyphosphate and tetrapotassium pyrophosphate. In addition many of the prior art cleaning formulations contain ingredients such as non-biodegradable surfactants or detergents which persist in the environment after being used or, like phosphates, may promote undesirable growth of algae.

Illustrative of the prior art cleaner formulations are those disclosed in U.S. Pat. No. 4,965,009 to Bauer et al. This describes non-biodegradable acidic cleaner formulations containing a thickener used to treat hard surfaces so that the viscosity of the cleaning formulation will prevent it from running too rapidly off the surface to be cleaned. See also U.S. Pat. No. 4,136,025 to Zwack et al., which discloses a method of cleaning a membrane that has been used in the treatment of cataphoretic paint containing lead with an acid that forms a water-soluble lead salt and a water-soluble organic solvent.

SUMMARY OF THE INVENTION

The cleaner formulation of this invention is effective in removing both organic and inorganic residues from filter surfaces, and, by virtue of the fact that it is biodegradable, it will not persist in the environment. The cleaner formulation of the invention comprises at least one carboxylic acid, and/or a salt thereof, at least one nonionic surfactant, a water-soluble organic solvent, and water. In addition, the formulation may optionally include, in varying proportions, colorants, fragrances, deodorants, or other materials which impart specific physical properties to the formulation. Manufacture of the formulation of the invention is easy because the nonionic surfactants used are liquid at room temperature and do not form water-surfactant gels. More importantly, the formulation is phosphorous-free and does not contribute to eutrophication.

DETAILED DESCRIPTION OF THE INVENTION

More in detail, the filter cleaning formulation of the invention comprises:

(a) a select biodegradable carboxylic acid and/or a salt thereof,
(b) a nonionic, biodegradable surfactant based on oxyalkylated linear alcohols,
(c) a water-soluble organic solvent, and
(d) water in an amount sufficient to solubilize the carboxylic acid component.

Further according to the invention, a method is provided wherein the formulation described herein is used as a concentrate to clean clogged or fouled filters. For this purpose, the formulation is diluted with water before it is used for soaking or treating the clogged filter. Depending on the amount of water used in preparing the concentrated formulation, any suitable volume ratio of water to original formulation may be used in preparing the diluted solution. For example, where a very dirty filter is to be soaked in the cleaner formulation, one may use two or more volumes of water per volume of the concentrated cleaner formulation, although ordinarily a volume dilution ratio of anywhere from about 10:1 to about 40:1 (i.e., about 10 to 40 unit volumes of water per each unit volume of the concentrated formulation) would be adequate. The term "concentrated" is used herein to refer to a cleaner formulation of the invention which is prepared using no substantial excess of water over the amount required to dissolve the carboxylic acid (and/or salt thereof) component. When cleaning filter elements which are fixed in a pool or spa line, the cleaner formulation is simply added to the filter housing, the water in the line and housing providing the necessary dilution.

The carboxylic acid component of the formulation of the invention serves primarily to remove hard water deposits and soap scums from the filter. Suitable carboxylic acids include acetic acid, the hydroxycarboxylic acids and di- and tri-carboxylic acids such as citric, gluconic, lactic, acetic, oxalic, malonic, succinic, maleic, fumaric, glutaric, and adipic acid. Citric acid is particularly preferred for its relative low cost, effectiveness, and excellent biodegradability. Although one carboxylic acid is usually used, mixtures of acids may also be appropriate. Also metal salts of these acids may be used, as well as mixtures of the salts and acids, the alkali metal salts being preferred. Particularly preferred for reasons of availability and economy are the sodium and potassium salts. When a carboxylic acid salt is used, the formulation can have a pH of 2-10, but it would be advantageous to bring the pH down to 2-5, by adding some carboxylic acid, thereby enhancing the efficacy of the resulting cleaning formulation.

The second component of the cleaner formulation of the invention is a nonionic biodegradable surfactant. The selection of nonionic surfactants, to the exclusion of anionic and cationic surfactants, is predicated on the fact that the nonionic surfactants provide solutions which remain homogeneous at low pH. By contrast anionic surfactants in general will separate from the solution in time, and cationic surfactants do not have as good surfactant properties as the nonionics and thus are not acceptable.

These nonionic surfactants are based on oxyalkylated linear alcohols. The compounds preferred for the filter cleaner formulation are adducts of from 2 to 50 moles of a mixture of ethylene oxide and propylene oxide per mole of a linear alcohol preferably having 6–18 carbon atoms, more preferably having 7–10 carbon atoms. These nonionic biodegradable surfactants can be represented by formula I as follows:

$$R-[OCH_2-CH(CH_3)]_x-(OCH_2CH_2)_y-OH \qquad (I)$$

in which R represents an alkyl group with 6–18 carbons, preferably 7–10 carbons,
x is an integer from 1 to 25, and
y is an integer from 1 to 25.

Examples of commercially available such surfactants are those sold under the trademarks or designations POLY TERGENT®SL-62 and POLY-TERGENT SL-42, both of which are are mixtures of poly(oxyethylene, oxypropylene) monohexyl, monooctyl, and monodecyl ethers. The use of either of these surfactants or blends thereof is advantageous in that they provide excellent wetting, penetrating, emulsifying, and cleaning properties. In addition, these surfactants are biodegradable, and do not form water-surfactant gels.

The water-soluble organic solvent used in the cleaner formulation of the invention provides solvent action, aiding in the dissolution of various filter soiling or fouling materials and thereby improving the overall cleaning efficiency of the formulation. Preferably the organic solvent is completely miscible with water, although organic solvents which are only partially water-miscible can be tolerated. The solvent can be any glycol ether, although the monoalkyl ethers of propylene glycols, in which the alkyl group contains from about 1–6 carbon atoms, are preferred. These glycol ethers can be represented by formula II as follows:

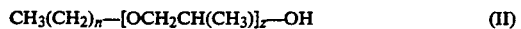

$$CH_3(CH_2)_n-[OCH_2CH(CH_3)]_z-OH \qquad (II)$$

in which n is an integer from 0 to 5, preferably 1 to 3, and z is an integer from 1 to 3, preferably 1 to 2.

Illustrative, such solvents include monomethyl, monoethyl and monobutyl ethers of propylene glycol and other polypropylene glycols. The monomethyl ether of dipropylene glycol, commercially available as POLY-SOLV®DPM glycol ether, is especially preferred because it has the optimum properties of solubility in water, surface tension, viscosity, evaporation rate, flash point, and cleaning performance compared to the other glycol ethers.

The carboxylic acid, or salt thereof, the nonionic surfactant and the organic solvent are each used in amounts which are effective to dissolve the residue material and clean the filter. Thus, as used in the specification and claims herein, the term "effective amount" is intended to include any such amount. By way of illustration, the carboxylic acid or salt thereof may be used in an amount ranging from about 30 to about 50% by weight based on the weight of the total concentrated formulation. A preferred range is about 38–48% and still more preferably about 42–46% by weight.

Likewise, the surfactant may be employed in a proportion ranging, for example, from about 1 to about 15% by weight of the total concentrated formulation, preferably about 2–12 and more preferably about 4–8%. As for the solvent, an illustrative proportion level is about 1–10, preferably about 2–6 and more preferably about 3–6% by weight of the weight of the total concentrated formulation. Moreover, the relative proportions of the surfactant and the solvent should be such as to provide in the concentrated formulation a weight ratio of surfactant to solvent ranging from about 1:2 to about 2:1.

Finally, as noted earlier the water level in the concentrated formulation should be sufficient to dissolve the carboxylic acid and/or the acid salt, if such is used. Thus it will become apparent that the minimum amount of water required will depend on the identity and amount of carboxylic acid and/or salt thereof which is used in the formulation. Illustratively such amount may range from about 20 to about 33% by weight based on the total weight of the concentrated formulation. Of course, since the formulation will be diluted with more water before it is used, larger amounts of water may be used in preparing the formulation than is required to dissolve the acid and/or salt thereof.

In addition to the essential components mentioned above, other optional ingredients such as color additives, fragrances, deodorants, dispersing agents, defoaming agents, bactericides and corrosion inhibitors, and so forth may be present. These optional ingredients may be added in any suitable, additive amounts such as up to about 5% by weight.

A solution of the biodegradable cleaner formulation is used to soak the filter for a period of time sufficient to clean and unclog the filter by dissolving and removing the residue material that is fouling and clogging the pores in the filter. The period of time the cleaner formulation must be in contact with the filter depends on the nature and degree of fouling or clogging and the type of residue. The filter should be soaked for at least one hour, preferably overnight. Alternately, the cleaner formulation may be used as part of a backwashing procedure enhancing the efficacy of the backwashing. Hosing off filter elements or backwashing filter installations provides rinsing action and increases the effectiveness of the cleaning procedure.

The effectiveness of the cleaning can be determined visually and by comparison of the flow rates of water permeating through the filter before and after cleaning. The rate of water flow is greater after the filter has been cleaned compared to when the filter is dirty and clogged. Usually the flow rates after cleaning are close to that of new filters.

The following examples are presented to further illustrate the invention without any intention of being limited thereby. All parts and percentages are by weight unless otherwise specified.

EXAMPLE 1

A 2,000 gm. batch of cleaner formulation was prepared as follows: 880 gms. of anhydrous citric acid were weighed in a 3 liter beaker. In order to dissolve all the citric acid at room temperature, 620 gms. of water were added with heating. This mixture was stirred until a clear solution resulted. Then 60 gms. of POLY-TERGENT SL-62 surfactant 60 gms. of POLY-TERGENT SL-42 surfactant and 80 gms. of POLY-SOLV DPM glycol ether were added to the mixture with continuous stirring. An additional amount of 300 gms. of water was added to bring the mixture up to 2,000 gms. Stirring was continued until the mixture was homogeneous.

EXAMPLE 2

An aqueous solution of sodium citrate was prepared by adding 38.8 gms. of sodium hydroxide to 620 gms. of water with stirring. When the sodium hydroxide dissolved, 880 gms. of anhydrous citric acid were added as stirring was continued. When the citric acid dissolved, 60 gms. of POLY-TERGENT SL-62 surfactant, 90 gms. of POLY-TERGENT SL-42 surfactant and 80 gms. of POLY-SOLV DPM glycol ether were added. An additional amount of 300 gms. of water containing 38.8 gm. sodium hydroxide was added. Stirring was continued until the mixture is homogeneous. The resulting formulation had a pH greater than 2.

EXAMPLE 3

The product of Example 1 was tested for biodegradability by a modification of the "Sturm Test". The test, which is based on OECD protocol No. 301-B, is used to determine the rate and extent of biodegradation of test material by sewage organisms through measurement of the evolved carbon dioxide. First microorganisms were acclimated through the following procedure. A sample of sewage sludge was maintained for 4–7 days without test material then treated with increasing concentrations of the formulation until, after 5 days, a concentration of 30 mg/L active ingredients was reached. This level was maintained for 11 days. On day 12 the sludge was blended for two minutes and allowed to settle, then microorganisms from this bottle were used to inoculate test bottles.

For the test, 1.98 L of a solution was prepared by adding 20 mg/L active ingredient to modified BOD water which had been purged with carbon dioxide-free air for 24 hours. After mixing, 20 ml of the inoculum was added. The experiment was carried out in triplicate with controls of RO water and 20 mg/L glucose. Carbon dioxide production was measured by titrating (with hydrochloric acid) the first of 3 serial traps containing barium hydroxide. The test was stopped on day 28 by adding 1 ml concentrated hydrochloric acid to the test bottles. The results show that the formulation is biodegraded as well as a positive control (glucose). For example, on day 8 of the experiment, 65.3% of the theoretical carbon dioxide had been generated (by comparison, the glucose control was 60.3% degraded). By day 16, 74.6% had been generated (glucose 69.8% degraded), and on day 28 the result averaged 86.1±1.5% of theoretical. Glucose was 84.0±1.9% degraded on day 28.

EXAMPLE 4

Used filter cartridges, the surfaces of which displayed varying degrees or levels of soiling, were ranked subjectively by appearance, i.e, level of soiling, then grouped into classes. Representative swatches from each class were mounted on a comparison board and then used to visually rate the cleanliness of soiled filter samples before and after each sample is treated with a cleaner formulation. A five-point rating scale was used in this example.

A soiled cartridge filter from a Florida pool was cut into 5 cm square samples or swatches, each of which was rated on the five-point scale for soil. Filter cleaning solutions were prepared from the formula of Example 1 by diluting 10 ml with 190 ml of tapwater. For comparison purposes, a commercial filter cleaner containing sulfamic acid was diluted according to label instructions (5 gm./200 ml water) and a trisodium phosphate solution was prepared by dissolving 10 gm./200 ml. Swatches were soaked for 1 hour, rinsed, and dried. Average ratings on the 5 point scale improved 12% for the formula of Example 1, were unchanged for the sulfamic acid containing commercial product, and improved 7% for the trisodium phosphate product.

EXAMPLE 5

A four-point rating scale was used in this example following the general procedure of Example 4. A soiled cartridge filter from a Connecticut pool was cut into 5 cm square swatches, each of which was rated on the four- point scale for soil. Filter cleaning solutions were prepared from the formula of Example 1 by diluting 10 ml with 190 ml of tapwater. Again for comparison purposes, a commercial filter cleaner containing sulfamic acid was diluted according to label instructions (5 gm./200 ml water). Likewise, a commercial filter cleaner having a pH of 13.28 was diluted according to label instructions by adding 5 ml to 160 ml tapwater, and trisodium phosphate solution was prepared by dissolving 10 gm./200 ml. Swatches were soaked for 1 hour, rinsed and dried. Ratings on the 4 point scale improved an average of 70% for the formula of Example 1, improved 60% for the sulfamic acid containing commercial product, and were unchanged for both the trisodium phosphate product and the basic commercial product.

EXAMPLE 6

A soiled cartridge filter from a Florida pool was cut into 5 cm squares, each of which was rated on the 5 point scale for soil. Filter cleaning solutions were prepared from the formula of Example 2 by diluting 10 ml with 190 ml of tapwater. Swatches were soaked for 45 minutes, rinsed and dried. Average ratings on the 5 point scale improved 13% for the formula of Example 2.

EXAMPLE 7

Clean, backwashed sand in a 20x400 mm column with glass frit was dosed with 50 gm. of a synthetic insult containing humic acid, suntan lotion, sodium and calcium carbonates and sulfates. The column was backwashed to collect 150 ml effluent, then flow through the column was measured by weighing the effluent from the full column in 3 minutes. Flow through the column was reduced to 24.8 gm./min. The column was drained until only 0.5 cm of fluid remained above the surface of the sand. To this prepared column was added 50 ml of a 1:20 dilution of the formula of Example 1, and the column was drained until 40 ml effluent was collected. The column was allowed to stand for 1 hour, backwashed as above, and the flow measured. Flow had improved upon cleaning to 74.9 gm./min.

EXAMPLE 8

A diatomaceous earth filter which had been disassembled for winter storage was treated with the filter cleaning formulation of Example 1. The elements were removed from the filter, hosed off, soaked overnight in a 1:30 dilution of Example 1 formula, and hosed off again. Initially the elements were brown, and they remained brown after the first rinse. However, after soaking in the filter cleaner solution the brown color was removed and the elements were visibly cleaner.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed:

1. A biodegradable, aqueous cleaner concentrate formulation comprising
   (a) about 30–50% by weight of a first component selected from the group consisting of a carboxylic acid, an alkali metal salt of said acid and mixtures thereof;
   (b) about 1–15% by weight of a nonionic surfactant represented by the formula $$R-[OCH_2-CH(CH_3)]_x-(OCH_2CH_2)_y-OH$$

in which R is an alkyl group having from 6 to 18 carbon atoms, and each of x and y is independently an integer from 1 to 25;
   (c) about 1–10% by weight of a water soluble glycol ether solvent represented by the formula $$CH_3(CH_2)_n-[OCH_2-CH(CH_3)]_z-OH$$

in which n is an integer from 0 to 5 and z is an integer from 1 to 3; and
   (d) water in an amount sufficient to solubilize said first component, in which formulation the weight ratio of said nonionic surfactant to said solvent ranges from about 2:1 to about 1:2.

2. The cleaner formulation of claim 1, wherein said carboxylic acid is selected from the group consisting of citric acid, gluconic acid, lactic acid, acetic acid, oxalic acid, malonic acid, succinic acid, maleic acid, fumaric acid, glutaric acid, and adipic acid.

3. The cleaner formulation of claim 2 wherein said carboxylic acid is citric acid.

4. A biodegradable aqueous acidic cleaner formulation as claimed in claim 1, in which said first component is present in a proportion of about 38–48% by weight.

5. A biodegradable aqueous acidic cleaner formulation as claimed in claim 1, in which said surfactant is present in a proportion of about 2–12% by weight.

6. A biodegradable aqueous acidic cleaner formulation as claimed in claim 1, in which said solvent is present in a proportion of about 2–6% by weight.

7. A biodegradable, acidic filter cleaner formulation as claimed in claim 1, comprising:
   (a) about 38–48% by weight of a carboxylic acid selected from the group consisting of citric acid, gluconic acid, lactic acid, acetic acid, oxalic acid, malonic acid, succinic acid, maleic acid, fumaric acid, glutaric acid, and adipic acid;
   (b) about 2–12% by weight of a biodegradable, nonionic surfactant represented by the formula:

$$R-[OCH_2-CH(CH_3)]_x-(OCH_2CH_2)_y-OH$$

wherein R is an alkyl group having from 7 to 10 carbon atoms and each of x and y is independently an integer from 1 to 25; and
   (c) about 2–6% by weight of a water-soluble glycol ether solvent represented by the formula:

$$CH_3(CH_2)_n-[OCH_2-CH(CH_3)]_z-OH$$

wherein n is an integer from 1 to 3 and z is 1 or 2.

8. The filter cleaner formulation of claim 7 wherein said acid is citric acid.

9. The filter cleaner formulation of claim 8 wherein said nonionic surfactant is a mixture of poly(oxyethylene, oxypropylene) monohexyl, monooctyl, and monodecyl ethers.

10. The filter cleaner formulation of claim 7 wherein said solvent is monomethyl ether of dipropylene glyco.

11. The filter cleaner formulation of claim 10 wherein said surfactant is a mixture of poly(oxyethylene, oxypropylene), monohexyl, monooctyl, and monodecyl ethers.

12. The filter cleaner formulation of claim 10 wherein said acid is present in a proportion from about 42 to about 46%, said surfactant is present in a proportion from about 4 to about 8%, and said solvent is present in a proportion from about 3 to about 6% by weight.

13. A method of cleaning a soiled or clogged filter which has been used to filter swimming pool or spa water, which method comprises treating said filter with a water-diluted cleaner formulation as claimed in claim 1.

14. A method of cleaning a soiled or clogged filter which has been used to filter swimming pool or spa water, which method comprises treating said filter with a water-diluted cleaner formulation as claimed in claim 7.

* * * * *